(12) United States Patent
Dietrich

(10) Patent No.: US 9,532,506 B2
(45) Date of Patent: Jan. 3, 2017

(54) HIGH RISE CROP LIFTER

(76) Inventor: Dave Dietrich, Assiniboia (SK)

( * ) Notice: Subject to any disclaimer, the term of this patent is extended or adjusted under 35 U.S.C. 154(b) by 145 days.

(21) Appl. No.: 14/238,012

(22) PCT Filed: May 17, 2012

(86) PCT No.: PCT/CA2012/000492
§ 371 (c)(1),
(2), (4) Date: May 19, 2014

(87) PCT Pub. No.: WO2013/020208
PCT Pub. Date: Feb. 14, 2013

(65) Prior Publication Data
US 2015/0143787 A1    May 28, 2015

(30) Foreign Application Priority Data

Aug. 11, 2011   (CA) ..................... 2748754

(51) Int. Cl.
*A01D 34/00* (2006.01)
*A01D 65/02* (2006.01)
*A01D 65/00* (2006.01)
*A01D 43/06* (2006.01)

(52) U.S. Cl.
CPC ............... *A01D 65/02* (2013.01); *A01D 43/06* (2013.01); *A01D 65/00* (2013.01)

(58) Field of Classification Search
CPC ........ A01D 65/02; A01D 65/00; A01D 41/14; A01D 57/20; A01D 43/06; A01D 41/142; A01D 61/002; A01D 34/14
USPC .................................................. 56/312, 313
See application file for complete search history.

(56) References Cited

U.S. PATENT DOCUMENTS

| 723,880 | A | * | 3/1903 | Koch | ..................... A01D 65/02 56/312 |
| 1,202,084 | A | * | 10/1916 | Merkel | ................. A01D 65/02 56/312 |
| 1,258,740 | A | * | 3/1918 | Blocki | ................... A01D 65/02 56/313 |
| 1,520,456 | A | | 12/1924 | Thoen | |

(Continued)

FOREIGN PATENT DOCUMENTS

| CA | 407654 | 9/1942 |
| FR | 380 078 | 11/1907 |

OTHER PUBLICATIONS

International Search Report and Written Opinion for PCT/CA2012/000492, mailed Sep. 11, 2012.

(Continued)

*Primary Examiner* — Árpád Fábián-Kovács
(74) *Attorney, Agent, or Firm* — Nixon & Vanderhye P.C.

(57) ABSTRACT

A crop lifter apparatus has a base member attached to a selected guard finger of a cutting header. A front lifting finger extends forward and downward from the base member at a first angle downward from horizontal, and a rear lifting finger extends rearward and upward from the base member at second angle upward from horizontal, where the second angle is greater than the first angle. A front end of the front lifting finger is at a front vertical location that is a first distance below a top surface of the table, and a rear end of the rear lifting finger is at a rear vertical location that is a second distance above the top surface of the table, and the second distance is at least twice the first distance.

2 Claims, 2 Drawing Sheets

(56) References Cited

U.S. PATENT DOCUMENTS

| | | | | |
|---|---|---|---|---|
| 1,834,008 A * | 12/1931 | Swanson | A01D 65/02 | |
| | | | 56/313 | |
| 1,942,286 A * | 1/1934 | Harkness | A01D 65/02 | |
| | | | 56/312 | |
| 2,099,471 A * | 11/1937 | Edgington | A01D 65/02 | |
| | | | 56/158 | |
| 2,141,299 A * | 12/1938 | Hume | A01D 65/02 | |
| | | | 56/313 | |
| 2,187,438 A | 1/1940 | Wilcos | | |
| 2,290,404 A | 11/1940 | Cardinal | | |
| 2,294,646 A * | 9/1942 | Young | A01D 65/02 | |
| | | | 56/313 | |
| 2,552,623 A * | 5/1951 | Dye | A01D 65/02 | |
| | | | 56/312 | |
| 2,576,122 A * | 11/1951 | Kenison | A01D 65/02 | |
| | | | 56/312 | |
| 2,577,324 A * | 12/1951 | Goesch | A01D 65/02 | |
| | | | 56/312 | |
| 2,734,332 A | 2/1956 | Fisher | | |
| 2,746,231 A * | 5/1956 | Ayers | A01D 65/02 | |
| | | | 56/220 | |
| 2,892,298 A | 6/1959 | Chaney | | |
| 2,960,814 A | 11/1960 | Babcock | | |
| 3,163,975 A * | 1/1965 | Lightsey | A01D 65/02 | |
| | | | 56/313 | |
| 3,742,690 A * | 7/1973 | Schumacher, II | A01D 65/00 | |
| | | | 56/313 | |
| 3,788,051 A * | 1/1974 | Richardson | A01D 65/00 | |
| | | | 56/318 | |
| 3,821,877 A * | 7/1974 | Weinheimer | A01D 65/02 | |
| | | | 56/312 | |
| 3,834,139 A * | 9/1974 | Schumacher, II | A01D 34/22 | |
| | | | 56/313 | |
| 4,120,138 A | 10/1978 | Schumacher | | |
| 4,441,307 A * | 4/1984 | Enzmann | A01D 41/14 | |
| | | | 56/10.2 R | |
| 4,704,850 A * | 11/1987 | Obermeier | A01D 45/021 | |
| | | | 56/112 | |
| 5,005,346 A * | 4/1991 | Medernach | A01D 65/00 | |
| | | | 56/312 | |
| 5,105,610 A * | 4/1992 | Britten | A01D 57/00 | |
| | | | 56/17.3 | |
| 5,943,849 A * | 8/1999 | Billheimer | A01D 65/00 | |
| | | | 56/119 | |
| 6,244,026 B1 * | 6/2001 | Minnihan | A01D 65/02 | |
| | | | 56/119 | |
| 6,691,499 B2 * | 2/2004 | Schumacher | A01D 65/02 | |
| | | | 56/312 | |
| 7,520,119 B2 * | 4/2009 | Yanko | A01D 65/02 | |
| | | | 56/312 | |
| 7,650,738 B2 | 1/2010 | Dietrich | | |
| 8,220,239 B2 * | 7/2012 | Dietrich | A01D 34/18 | |
| | | | 56/312 | |
| 8,991,145 B2 * | 3/2015 | Dietrich | A01D 65/02 | |
| | | | 56/312 | |
| 9,220,199 B2 * | 12/2015 | Holler | A01D 65/02 | |
| 2002/0166314 A1 * | 11/2002 | Schumacher | A01D 65/02 | |
| | | | 56/119 | |
| 2007/0028581 A1 * | 2/2007 | Dietrich | A01D 65/02 | |
| | | | 56/307 | |

OTHER PUBLICATIONS

Internet Citation, "Crop Lifter Manufactured by Power Harvesting", LDH Reichelt (Aug. 4, 2011).

Supplementary European Search Report mailed Mar. 9, 2015 for EP 12 82 2594.

* cited by examiner

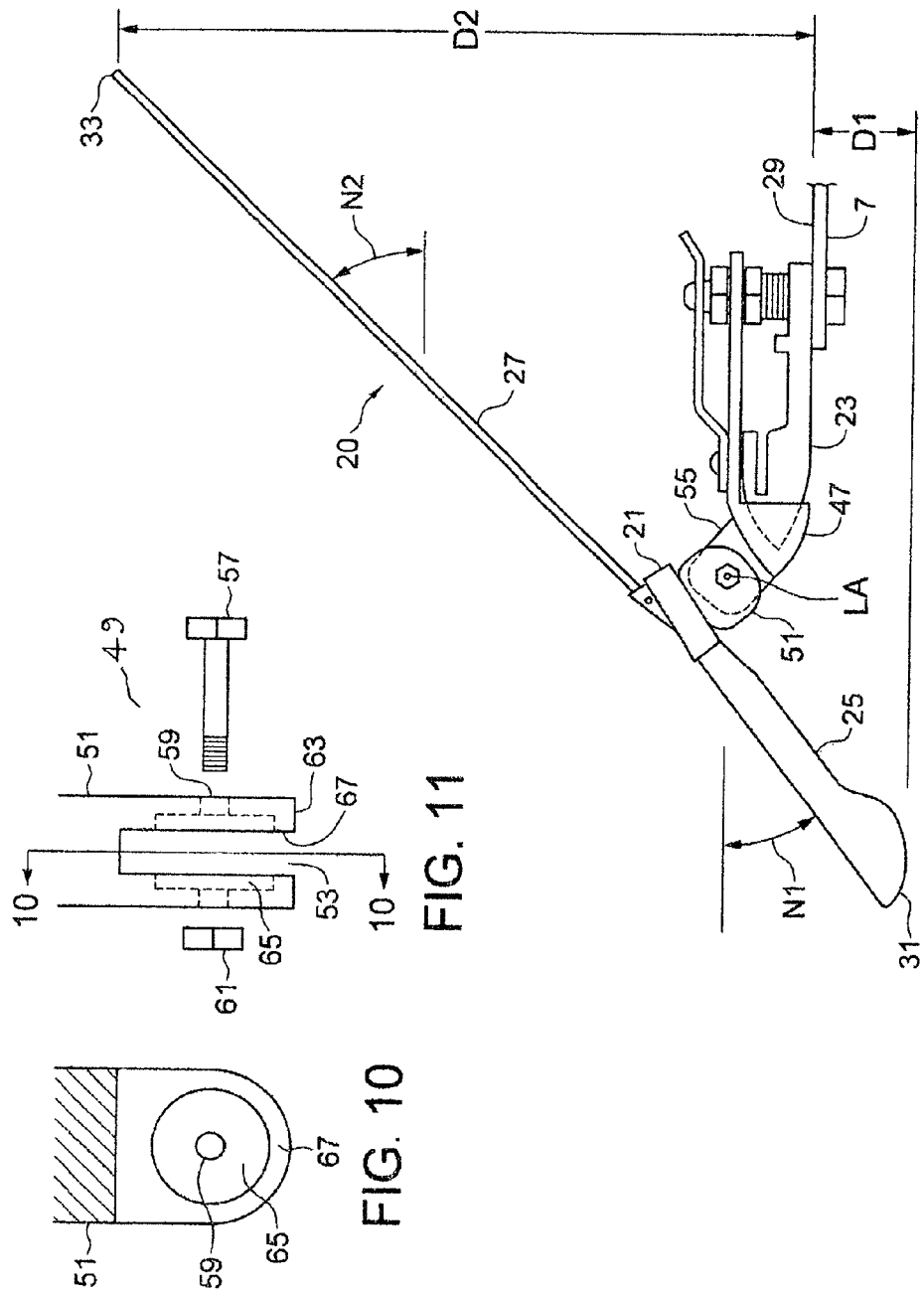

HIGH RISE CROP LIFTER

This application is a National Phase of International Application No. PCT/CA2012/000492, filed on May 17, 2012, which designated the U.S. and claims priority to CA Application No. 2748754, filed on Aug. 11, 2011, the entire contents of which is hereby incorporated by reference.

This invention is in the field of cutting headers such as are used in agriculture for cutting crops for harvest and the like, and in particular with crop lifters mounted on such headers to increase crop gathering and retention in the harvesting machine.

BACKGROUND

For various reasons crops sometimes are lying so close to the ground that it is difficult to cut them with a conventional harvest header. Some crops are inherently short, while others may be taller, but are prone to fall down when they reach maturity. Heavy rain or hail can also cause crop to be lying close to the ground at harvest time. Such a crop where relatively tall crop plants fall over close to the ground is commonly called a lodged crop.

Typically the knife on cutting headers comprises a knife bar extending along the front lower edge of the header, with a plurality of triangular knife sections attached to the bar such that the apex of the triangle extends forward from the bar. The exposed side edges of the knife sections are sharpened. Guards are attached to the front lower edge of the header and serve to protect the knife sections from breakage when contacting stones and like obstructions. The guards comprise pointed guard fingers extending forward, and the knife moves back and forth along the edge of the header in a slot cut laterally through the guard fingers. In addition to protecting the knife, the guard fingers also enable the knife sections to cut the crop. As the knife section moves back and forth it pushes crop against the sides of those portions of the guard finger that are above and below the slot, shearing the crop stalks.

A conventional knife is a few inches above the ground when the header is in its lowest position, such that very short or downed crop material will pass under the knife and be lost. Many different kinds of "crop lifters", as they have come to be known, have been developed over the last century and more. Typically these crop lifters are attached to the header and/or the forward extending point of the guard finger, and provide an arm of various designs that rides along the ground ahead of the knife. A lifting finger extends at a shallow angle from the front of the arm back and over the knife. As the header moves down the field, the arm rides along the ground and under the downed crop stalks, which then are lifted and pass over the lifting finger to the knife, where they are cut and continue moving onto the header from where they can be passed to the harvester, swatter table, or the like.

U.S. Pat. Nos. 700,029 and 791,022 to Gatermann, U.S. Pat. No. 2,734,332 to Fisher, U.S. Pat. No. 2,892,298 to Chaney, U.S. Pat. No. 2,960,814 to Babcock, and Canadian Patent Number 407,654 to Young disclose a crop lifter that is pivotally attached to the header so as to be able to move up and down to follow the ground. The Babcock and Fisher devices float on the ground, while the others are biased toward the ground by springs. U.S. Pat. No. 4,120,138 to Schumacher illustrates a crop lifter that is fixed to the header instead of pivoting, but is made of spring steel so that same may move up and down to follow the ground.

U.S. Pat. No. 7,650,738 to Dietrich discloses a crop lifter with a bore member that is secured to a guard finger. The bore member defines a bore and the lifting finger extends through the bore such that a forward end thereof extends downward and forward from the bore member at a shallow angle to pass under and raise the crop stalks, and the rearward portion of the lifting finger extends rearward from the bore member and upward at the same shallow angle to a rear end above and rearward of the knife. The shallow angle is fixed at a desired angle that suits the conditions being encountered and can be adjusted.

Once cut, it is most desirable for efficient operation of the harvester mechanisms to deliver the stalks in a smooth orderly now from the knife to a feeding mechanism that conveys the stalks up into the harvester mechanism. Draper type cutting headers have right and left wide conveyor belts that move along the header table perpendicular to the operating travel direction with front edges thereof just behind the knife. The cut crop stalks fall onto the belts and are carried to a middle conveyor belt moving rearward that receives the stalks and carries them rearward into a feeder mechanism that moves them into the harvester mechanism. When cutting upright crop stalks, the stalks fall onto the belts generally parallel to each other, with the heads at the top ends of the stalks together on the inner side of the belts, and are moved smoothly to the middle conveyor belt and head first into the feeder mechanism.

In contrast, auger type cutting headers for harvesters have a large diameter auger extending from one end of the header to the other perpendicular to the operating travel direction. Right hand and left hand auger flighting on corresponding end portions of the auger carry the cut crop stalks to a feeder mechanism generally in the middle of the table. Fingers on the middle portion of the auger grab the stalks and push them rearward into the feeder mechanism. In the auger type header there is some distance between the knife and the outer edges of the auger fighting. When cutting upright crop stalks, the stalks fall against the flighting as they are cut and are moved smoothly to the feeder mechanism with the heads at the top ends of the stalks falling toward the center so that the stalks enter the feeding mechanism head first.

When the crop stalks are tying down close to the ground however, crop lifter are often required to raise the stalks above the knife so same can be cut. These conventional crop lifters only raise the stalks a short distance above the knife, such that they when cut they are still generally lying down. The cut stalks can have heads pointed in all directions and, in an auger type header, once cut they must slide rearward across a width of header table before contacting the auger flighting under generally the rotational center of the auger where outer edges of the fighting are located close to the header table. In some conditions the stalks do not flow smoothly over the table to the auger, but bunch up and move to the auger in lumps, reducing the efficiency of the harvester.

In both auger and draper type headers, with conventional crop lifters raising crop stalks that are lying down, the stalks enter the feeder mechanism oriented in all directions, some sideways, some cut end first, and with only a portion in the desirable head first orientation. Harvester efficiency is reduced compared to a smooth head first flow of crop stalks.

SUMMARY OF THE INVENTION

It is an object of the present invention to provide a crop lifter apparatus that overcomes problems in the prior art.

The present invention provides a crop lifter apparatus for attachment to a cutting header, the cutting header having a knife and guards attached to a lower front edge of a table of the header, with guard fingers of the guards extending forward from the lower front edge of the table. The apparatus comprises a base member attached to a selected guard finger of the cutting header. A front lifting finger extends forward and downward from the base member at a first angle downward from horizontal, and a rear lifting finger extends rearward and upward from the base member at second angle upward from horizontal, where the second angle is greater than the first angle. A front end of the front lifting finger is at a front vertical location that is a first distance below a top surface of the table, and a rear end of the rear lifting finger is at a rear vertical location that is a second distance above the top surface of the table, and the second distance is at least twice the first distance.

The crop lifter apparatus of the invention raises lodged crop stalks higher compared to conventional crop lifters, and improves the flow of lodged crop material into the harvester mechanism.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 9 is schematic side view of the embodiment of a crop lifter apparatus of the present invention mounted on the header as shown in FIG. 5;

FIG. 10 is a sectional view along line 10-10 in FIG. 11;

FIG. 11 is a front view of a lock mechanism used in the embodiment of a crop lifter apparatus of the present invention shown in FIG. 9.

DETAILED DESCRIPTION OF THE ILLUSTRATED EMBODIMENTS

Figure 1:
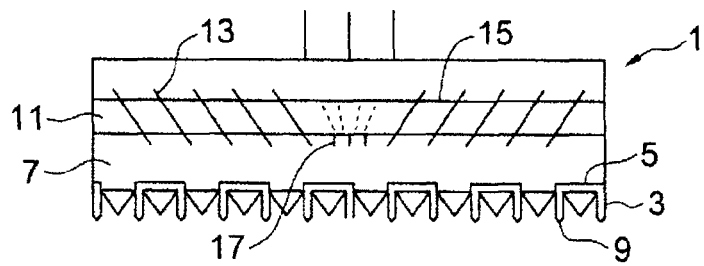
FIG. 1 is a schematic top view of a conventional auger type cutting header of the prior art.
Figure 2:
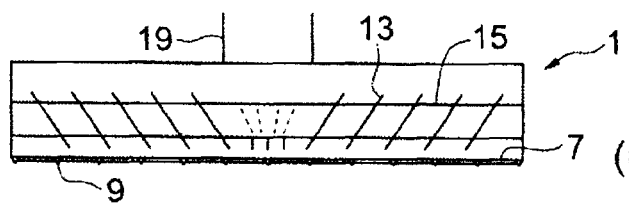
FIG. 2 is a schematic front view of the header of FIG. 1.
Figure 3:
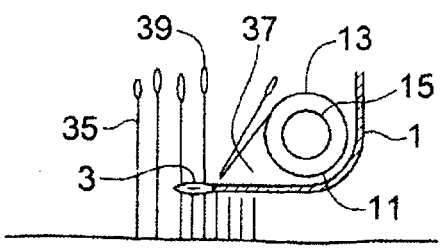
FIG. 3 is a schematic cut away side view of the header of FIG. 1 cutting an upright crop.

FIGS. 1-3 schematically illustrate a cutting header 1 of the prior art having a knife 3 and guards 5 attached to a lower front edge of the table 7 the header 1 with guard fingers 9 of the guards 5 extending forward from the lower front edge of the table 7. The illustrated cutting header 1 is an auger type header with an auger 11 extending across a width of the cutting header 1. The auger 11 comprises auger flighting 13 extending outward from an auger tube 15. The flighting 13 is oriented right and left on opposite sides of middle section, such that crop material from each side of the table 7 is moved to the middle section of the auger 11 where retracting fingers 17 extend from the tube 15 and push the crop material rearward into a feeder mechanism 19, such as a feeder chain or feed beaters, which in turn moves the crop material into the harvesting mechanism.

Figure 5:
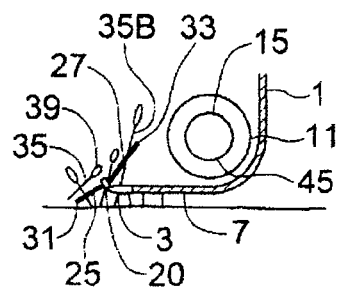
FIG. 5 is a schematic cut away side view of the header of FIG. 1 with an embodiment of a crop lifter apparatus of the present invention attached cutting a lodged crop.

FIGS. 5 and 9 illustrate an embodiment of a crop lifter apparatus 20 of the present invention. The apparatus 20 comprises a base member 21 attached to a selected guard finger 23 mounted to the lower front edge of the table 7. A front lifting finger 25 extends forward and downward from the base member 21 at first angle N1 downward from horizontal. A rear lifting finger 27 extends rearward and upward from the base member 21 at second angle N2 upward from horizontal, where the second angle N2 is greater than the first angle N1.

The front end 31 of the front lifting finger 25 is at a front vertical location that is a first distance D1 below the top surface 29 of the table 7, and the rear end 33 of the rear lifting finger 27 is at a rear vertical location that is a second distance D2 above the top surface 29 of the table 7, and the second distance D2 is at least twice the first distance D1.

Figure 6:
FIG. 6 is a schematic top view of the upright crop of FIG. 3.

FIG. 3 schematically illustrates an auger type cutting header 1 cutting upright crop stalks 35. FIG. 6 schematically illustrates a top view of such upright crop plants with heads 39 more or less vertically aligned with the stalks 35.

In these auger type cutting headers, there is a space 37 between the knife and the outer edges of the auger flighting 13. When cutting upright crop stalks 35, the upper part of the stalks fall against the flighting 13 as they are cut and the flighting 13 moves the upper part toward the middle retracting fingers 17, and the lower part of the stalk follows, such that the stalks 35 fall onto the table 7 with heads 39 toward the middle of the table 7. The stalks are thus moved smoothly to the middle of the auger 11 and enter the feeding mechanism head first.

Figure 4:
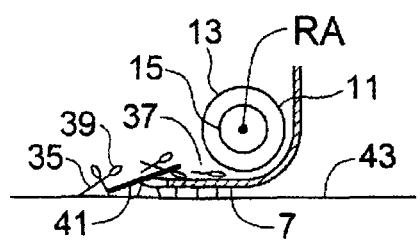
FIG. 4 is a schematic cut away side view of the header of FIG. 1 with a conventional crop lifter attached cutting a lodged crop.
Figure 7:
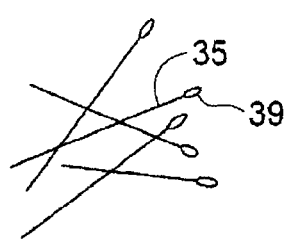
FIG. 7 is a schematic top view of the lodged crop of FIGS. 4 and 5.

FIG. 4 schematically illustrates an auger type cutting header 1 cutting fallen down crop stalks 35 in a lodged crop. A conventional crop lifter 41 is mounted on the header 1, and the table 7 is operated at a lower height above the ground 43 than in the upright crop of FIG. 3. FIG. 7 schematically illustrates a top view of such lodged crop plants. Commonly such lodged plants fall in the same general direction, being pushed in one direction generally by wind, rain and the like. The illustrated heads 39 have fallen generally toward the right, and are leaning at various angles as generally illustrated in FIGS. 4 and 7.

As seen in FIG. 4, the conventional crop lifter 41 only raises the stalks a short distance above the knife 3, such that they when cut they are still generally lying down. The cut stalks 35 can have heads 39 pointed in different directions and, in the illustrated auger type header 1, once cut they must slide rearward across the space 37 between the knife 3 and the outer edges of the auger flighting 13 before contacting the auger flighting under generally the rotational axis RA of the auger 11 where outer edges of the flighting 13 are located close to the header table 7. When the crop is wet or mixed with soil, as is not uncommon, the stalks 35 can bunch up on the table 7 and then eventually move to the auger 11 in lumps.

Further, the conventional crop lifter 41 simply lifts the lodged stalks 35 barely above the knife, and they are still in their disordered state as shown in FIGS. 4 and 7. With the fairly common situation where the stalks are lying with the heads generally pointed in one direction as shown in FIG. 7, the it can be seen that the stalks 35 on one side of the feeder mechanism 19 will be carried to the feeder mechanism generally head first while those on the opposite side will be carried into the feeder mechanism with the cut end of the stalk 35 first, or head last, reducing the efficiency of the harvesting mechanism.

In draper type headers, the belts move laterally just behind the knife so there is no dead space, and bunching and lumpy feeding is reduced, but in these draper headers as well the stalks on one side enter the feeder mechanism head first, while those on the opposite side enter head last.

FIG. 5 schematically illustrates the auger type cutting header 1 cutting fallen down crop stalks 35 in a lodged crop where a crop lifter apparatus 20 of the present invention is mounted on the header 1. The table 7 is operated at a lower height above the ground 43, the same as with the conventional crop lifter illustrated in FIG. 4, and the lodged crop plants are the same as schematically illustrated in FIG. 7. It can be seen that the rear lifting finger 27 slopes upward from the knife 3 at a steeper angle N2 than in the conventional crop lifter 41 of FIG. 4. The front lifting finger 25 slopes downward at a lesser angle N1, so that the front lifting finger 25 is oriented similar to the front portion of the conventional crop lifter 41, and raises stalks 35 in about the same fashion.

Further it can be seen that, with the greater length and steeper angle, the rear end 33 of the rear lifting finger 27 is much higher than the rear end of the lifting finger of the conventional crop lifter 41. It is contemplated that the length of the rear lifting finger 27 will be about 15-24 inches, and will be selected to suit different types and styles of header. It is further contemplated that the rear vertical location of the rear end 33 of the rear lifting finger 27 will be about six to 10 inches above the surface 29 of the table 7, above a bottom edge 45 of the auger tube 15.

It can be seen that stalks 35 are raised to a higher elevation than is the case with the conventional crop lifter 41.

Figure 8:
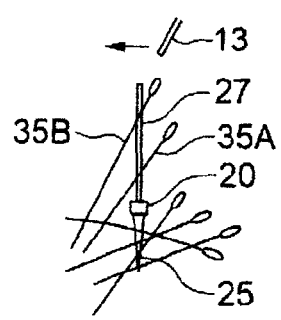
FIG. 8 is a schematic top view of the crop lifter apparatus of FIG. 5 cutting a lodged crop.

FIG. 8 schematically illustrates a top view of the crop lifter apparatus 20 working in the lodged crop as in FIG. 5. It can be seen that stalk 35A is shown at about the position where same would be at the rear end of the lifting finger of the conventional crop lifter 41, where same would drop to the table. Stalk 35B is approaching the rear end of the rear lifting finger 27 and is much closer to the auger flighting 13 as seen in the top view of FIG. 8, and is also much higher as seen in the side view of FIG. 5. Thus it can be seen that the crop lifter apparatus 20 will improve the flow of lodged stalks 35 by raising the stalks higher so they will lie at least somewhat straighter, with more heads pointed toward the middle feeder mechanism location. This more orderly orientation improves feeding in both auger and draper type headers.

Raising the stalks higher before they are cut also increases the length of the cut stalk such that more crop material is present and the cut stalks start out closer to the auger, so that the dead space between the stalks and the auger is reduced.

It has been found that using a spring steel rod with a diameter of about 0.1 to 0.25 inches for the rear lifting finger 27 has some benefits. With such a resilient rear lifting finger 27, during operation, vibrations from the harvesting mechanism pass through the cutting header and are transferred to the rear lifting finger 27, such that the rear lifting finger 27 vibrates during operation. It is not entirely clear what the effect actually is, however this vibrating rear lifting finger appears to have benefits in separating and straightening the tangled crop stalks. It is contemplated that the rear lifting finger could also be made of fiberglass or some plastic material, and could also taper from a larger diameter at the front end to smaller diameter at the rear end.

The illustrated crop lifter apparatus 20 has an adjustable angle with respect to the horizontal to allow variation of the angle to suit different conditions. A guard finger bracket 47 is attached to a pointed end of the selected guard finger 23, and the base member 21 is attached to the guard finger bracket 47 about a lifter pivot axis LA oriented substantially horizontally and perpendicular to an operating travel direction T of the header. A locking mechanism 49 is operative to fix the base member 21 with respect to the guard finger bracket 41 at a selected orientation.

The locking mechanism 49 is shown in FIGS. 10 and 11. A lobe 51 extends downward from the illustrated base member 21. The lobe 51 defines a gap 53 between lobe legs 63 into which a corresponding lug 55 on the guard finger bracket 47 is inserted, and a bolt 57 is inserted through corresponding holes 59 in the lobe 51 and lug 55, and a nut 61 is tightened onto the bolt 57 to clamp the lug in the gap 53.

A circular recess 65 is defined on each inner surface of the lobe legs 63 adjacent to the holes 59. The bolt 57 and nut 61 exert the clamping force on the lug 55 at the hole 59 and if the inner faces of the lobe legs 63 are flat, clamping forces would be concentrated on the surface area of the inner faces of the lobe legs 63 that are adjacent to the holes, and then diminish farther from the holes. Providing the recesses 65 removes the material on the inner faces of the lobe legs 63 near the hole so that the clamping forces are distributed to the inner faces 67 of the lobe legs 63 around the recesses 65, thereby increasing the surface area where the clamping forces are greatest, and thereby reducing the risk that the lobe 51 and lug 55 will move with respect to each other. Recesses are provided on inner faces of both lobe lees 63, however a recess on only one side would also perform the required function.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A cutting header apparatus comprising:
    a knife and guards attached to a lower front edge of a table of the header;
    guard fingers of the guards extending forward from the lower front edge of the table;
    a rotating auger extending across a width of the cutting header, the auger comprising auger flighting extending outward from an auger tube;
    a guard finger bracket attached to a pointed end of a selected guard finger, and wherein a base member is attached to the guard finger bracket about a lifter pivot axis oriented substantially horizontally and perpendicular to an operating travel direction of the header;
    a locking mechanism operative to fix the base member with respect to the guard finger bracket at a selected orientation;
    a front lifting finger extending forward and downward from the base member at a first angle downward from horizontal;
    a rear lifting finger extending rearward and upward from the base member at second angle upward from horizontal;
    wherein the second angle is greater than the first angle;

wherein a front end of the front lifting finger is at a front vertical location that is a below a top surface of the table;

wherein a rear vertical location of a rear end of the rear lifting finger is above a bottom edge of the auger tube.

2. The apparatus of claim 1 wherein the rear lifting finger is configured such that the rear vertical location of the rear lifting finger is above the bottom edge of the auger tube at least a distance greater than 50% of a radius of the auger tube.

* * * * *